2,956,977
Patented Oct. 18, 1960

2,956,977

ESTERS OF 6-CYANONORCAMPHANE-2(OR 3)-CARBOXYLIC ACID AND RESIN PLASTICIZED THEREWITH

John R. Caldwell and Winston J. Jackson, Jr., Kingsport, Tenn., assignors to Eastman Kodak Company, Rochester, N.Y., a corporation of New Jersey No Drawing. Filed May 15, 1958, Ser. No. 735,357

9 Claims. (Cl. 260—31.2)

This invention relates to a new class of esters that are useful for plasticizing plastic compositions.

In the preparation of such plastic or resin compositions as cellulose esters, polyvinyl chloride, nitrile-containing polymers and other plastic compositions for various uses, it is common practice in the art to modify their properties by the addition of materials having plasticizing or softening action. Firstly, of course, it is a requisite of a proposed plasticizer additive that it is able to plasticize the particular resin composition that it is added to. Also, a plasticizer additive must have such properties as low volatility, water resistance and compatibility with the resin being plasticized.

Low boiling plasticizers evaporate slowly on standing at room temperature or at temperatures to which the resin is subjected to, either in preparation or in use. As a result, films or molded articles thereof become brittle and may easily crack or break.

Also, resins may be subjected to water in their use. If the plasticizer is water-soluble to even a small extent, the plasticizer is ultimately leached out and the resin becomes hard and brittle.

If the plasticizer is not compatible in the proportions generally used in the resin, the plasticizer will exude from films and molded articles of the resin to give an oily feel to these articles. Here again, loss of the plasticizer material from the resin results in a reversion to the resin's original hardness or brittleness.

Many compounds tested as possible plasticizers for such resins or cellulose esters, polyvinyl chloride and nitrile-containing polymers fail in one or more of the necessary and desired properties of ability to plasticize, low volatility, resistance to water leaching and compatibility. Hence, the only sure way of determining the suitability of a likely plasticizer compound is to actually test the compound in the resin.

It is an object of this invention to provide a new class of esters.

It is another object of this invention to provide plastic compositions plasticized with a new class of plasticizers.

It is also an object of this invention to provide novel plasticizers having low volatility and resistance to water leaching.

It is likewise an object of this invention to provide a new class of plasticizing materials that are compatible with, and suitable for plasticizing, nitrile-containing polymers as well as cellulose ester and polyvinyl chloride resins.

These and other objects of this invention are accomplished by means of this invention as described more fully hereinafter with reference to preferred embodiments thereof.

The novel compounds of the invention are esters of 6-cyanonorcamphane-2(and 3)-carboxylic acid, which esters can be represented by the following structural formulas:

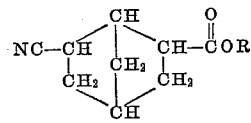

and

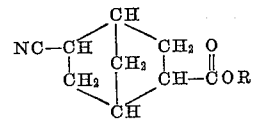

wherein R is an alkyl radical having 1 to 10 carbon atoms. The substituent R in the above structural formulas can be either straight-chained or branch-chained alkyl radicals, typical of the substituents being methyl, ethyl, n-propyl, isopropyl, n-butyl, isobuytl, n-amyl, n-hexyl, 2-ethylbutyl, n-heptyl, n-octyl, 2-ethyl-n-hexyl, n-nonyl, 2-methyl-n-octyl, n-decyl and related alkyl radicals.

The esters of the invention are prepared by esterifying 6-cyanonorcamphane-2(and 3)-carboxylic acid with a suitable alcohol (ROH wherein R is an alkyl radical as described above). The esters are prepared by heating the carboxylic acid with an excess of alcohol in the presence of a catalyst such as toluene sulfonic acid, titanium tetrabutoxide or the like in accordance with usual esterification practice. The excess alcohol can be utilized as a solvent in the esterification reaction. Likewise, inert organic solvents such as benzene, toluene, xylene and the like can be used. The esterification is readily effected by merely refluxing the reactants.

The 6-cyanonorcamphane-2(and 3)-carboxylic acid used in preparing the esters of the invention can be prepared by hydroformylating bicyclo[2,2,1] hept-5-ene-2-carbonitrile to yield 6-cyanonorcamphane-2(and 3)-carboxaldehyde. This hydroformylation reaction can be carried out in an inert solvent such as benzene with hydrogen and carbon monoxide in the presence of dicobalt octacarbonyl at a temperature of about 120° C. to 140° C. The carboxaldehyde reaction product is a mixture of 6-cyanonorcamphane-2-carboxaldehyde and 6-cyanonorcamphane-3-carboxaldehyde as well as cis and trans isomers and endo and exo isomers that typically comprise such reaction products. The carboxaldehyde reaction product is thereafter oxidized to 6-cyanonorcamphane-2(and 3)-carboxylic acid. This oxidation can be effected by treating the carboxaldehyde with nitrogen dioxide in an inert solvent such as carbon tetrachloride at a temperature of about 20° C. to 35° C. The oxidation can also be carried out catalytically with air or chemically with silver oxide, potassium permanganate, potassium dichromate or nitric acid. The carboxylic acid oxidation product like its carboxaldehyde precursor is a corresponding isomeric mixture.

The preparation of 6-cyanonorcamphane-2(and 3)-carboxylic acid and esters thereof as described above can be represented by the following equations:

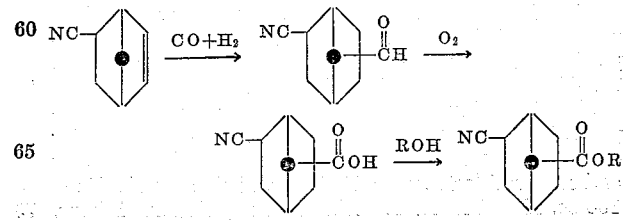

The esters of the invention, namely, esters of 6-cyanonorcamphane-2-carboxylic acid and 6-cyanonorcamphane-3-carboxylic acid as well as mixtures thereof are particularly useful for plasticizing various plastic resins. The esters of the invention impart softness and flexibility to the resin composition plasticized therewith. The esters of the invention are used in concentrations of 10% to 60%, and preferably 20% to 40%, as plasticizers in plastic compositions. The aforementioned concentrations are based on the combined weight of the resin and the plasticizer.

Cellulose esters can be plasticized with the esters of the invention and include the normally solid cellulose esters of fatty acids having 2 to 4 carbon atoms. Typical cellulosic resins that can be suitably plasticized in accordance with the invention include cellulose triacetate, cellulose acetate propionates, cellulose acetate butyrates, and the like.

Likewise, normally solid polyvinyl chloride resins can be plasticized with the cyanonorcamphane esters of the invention.

In a like manner, normally solid nitrile-containing polymers can be plasticized with the cyanonorcamphane esters of the invention. Typical of the nitrile-containing polymers that can be plasticized with the subject esters include copolymers of acrylonitrile and vinyl chloride, copolymers of acrylonitrile and methyl acrylate and related polymeric materials containing a substantial amount of nitrile groups. That the subject cyanonorcamphane esters were found to be effective plasticizing materials for nitrile-containing polymers was unexpected in view of the inability of other norcamphane esters such as the butyl ester of norcamphane-2,3-dicarboxylic acid to plasticize such polymers, even though the butyl ester of norcamphane-2,3-dicarboxylic acid effectively plasticizes such resins as cellulose triacetate and polyvinyl chloride.

The plasticizer materials of the invention can be incorporated into resins or plastics by conventional methods. A preferred method of incorporation is blending by milling on heated rolls.

The novel compounds of the invention, esters of 6-cyanonorcamphane-2(and 3)-carboxylic acid, are eminently suited as plasticizers for such resins as cellulose esters, polyvinyl chloride and nitrile-containing polymers as these plasticizing esters have low volatility, are resistant to water leaching and are compatible in these resins.

The following examples further illustrate the invention with reference to preferred embodiments thereof, but not with the intention of unduly limiting the same.

*Example 1*

(a) A solution containing 476 g. of bicyclo[2,2,1]hept-5-ene-2-carbonitrile in 2 l. of benzene was placed in an autoclave with 30 g. of dicobalt octacarbonyl. The autoclave was purged with nitrogen. Hydrogen (800 p.s.i.) was pressed in and then 1:1 hydrogen-carbon monoxide to 2,000 p.s.i. The resulting reaction mixture was heated to 140° C. and the pressure increased to and held at 3,000 p.s.i. with 101 hydrogen-carbon monoxide. When no more gas was taken up, the mixture was cooled, filtered, and flash-distilled. The weight of the resulting crude product boiling at 110–118° C. under 3 mm. of pressure was 408 g. When carefully fractionated through a 1½ inch by 60 inch vacuum jacketed column containing Podbelniak Helipak, the resulting isomeric mixture of 6-cyanonorcamphane-2-(and 3)-carboxaldehyde distilled at 110–128° C. under 4 mm. of pressure. Based on an empirical formula of $C_9H_{11}NO$, the theoretical proportion of carbon is 72.5% and hydrogen is 7.4%, 72.34% carbon and 7.51% hydrogen being found.

(b) To a stirred solution of 149 g. of 6-cyanonorcamphane-2(and 3)-carboxaldehyde (B.P. 120–128° C. under 4 mm. of pressure and having $n_D^{20}$ 1.4951) in 500 cc. of carbon tetrachloride was added 55 g. of nitrogen dioxide in 100 cc. of carbon tetrachloride over a period of ½ hour. During the addition and during the next 2 to 3 hours the solution was occasionally briefly cooled with ice water to keep the temperature below 30° C. After the solution was allowed to stand overnight at room temperature, dry air was bubbled in to sweep out the $NO_2$. After about one hour, this introduction of dry air was continued at 60° C. on a steam bath until the solution became yellow. The product was extracted with sodium bicarbonate solution, which was washed with ethylene dichloride and then acidified with nitric acid. The lower, oily layer of product was taken up in ethylene dichloride. This solution was washed with water and dried with sodium sulfate. The ethylene dichloride solvent was distilled off to leave 129 g. of an isomeric mixture of 6-cyanonorcamphane-2(and 3)-carboxylic acid in the form of an orange sirup-like material which became a mushy solid on standing. The neutral equivalent was 166 (calcd. value is 165). The product was then recrystallized from carbon tetrachloride.

*Example 2*

A 16.5 portion of the cyanonorcamphane carboxylic acid material prepared in accordance with the method described in Example 1 was refluxed for 6 hours with 40 cc. of methyl alcohol in the presence of 0.5 g. of p-toluenesulfonic acid. The resulting reaction product was then cooled and poured into water, taken up in benzene, washed with an aqueous sodium bicarbonate solution, dried with sodium sulfate and thereafter further purified by distillation. The resulting ester product was an isomeric mixture of the methyl esters of 6-cyanonorcamphane-2-carboxylic acid and 6-cyanonorcamphane-3-carboxylic acid. The ester product boiled at 112° C. under 2 mm. of pressure. Based on an empirical formula of $C_{10}H_{13}NO_2$ for the ester product, 7.8% nitrogen is the theoretical proportion, 7.72% being found. A mixture containing 40 parts by weight of the prepared methyl cyanonorcamphane ester product and 100 parts by weight of cellulose triacetate was milled on heated rolls to give a clear, flexible and tough plasticized sheet, the ester additive to the cellulose triacetate not oiling-out on standing and showing resistance to water leaching. In a like manner polyvinyl chloride was similarly suitably plasticized with the same proportions of the prepared methyl cyanonorcamphane ester product.

*Example 3*

A 16.5 g. portion of the cyanonorcamphane carboxylic acid material prepared in accordance with the method described in Example 1 was refluxed for 12 hours with 20 cc. of 2-ethylbutanol in 20 cc. of toluene in the presence of 2 drops of titanium tetrabutoxide. During the course of the reaction, the theoretical amount of water (1.8 cc.) collected in a Dean-Stark trap attached to the reactor employed. The resulting reaction mixture was cooled, washed with aqueous sodium bicarbonate solution, dried with sodium sulfate and further purified by distillation. The resulting ester product was an isomeric mixture of the 2-ethylbutyl esters of 6-cyanonorcamphane-2-carboxylic acid and 6-cyanonorcamphane-3-carboxylic acid. The ester product was a colorless liquid, boiled at 150° C. under 1.5 mm. of pressure and had $n_D^{20}$ 1.4742. Based on an empirical formula of $$C_{15}H_{23}NO_2$$

for the ester product, 5.6% nitrogen is the theoretical proportion, 5.51% being found. A mixture containing 40 parts by weight of the prepared 2-ethylbutyl cyanonorcamphane ester product and 100 parts by weight of cellulose triacetate was milled on heated rolls to give a clear flexible and tough plasticized sheet, the ester additive to the cellulose triacetate not oiling-out on standing and showing resistance to water leaching. In a like manner polyvinyl chloride was similarly suitably plasticized with the same proportions of the prepared 2-ethylbutyl cyanonorcamphane ester product.

Example 4

The n-butyl ester of the invention was prepared by substituting n-butanol for 2-ethylbutanol in the process described in Example 3. The resulting ester product was as isomeric mixture of the n-butyl ester of 6-cyanonorcamphane-2-carboxylic acid and 6-cyanonorcamphane-3-carboxylic acid. The ester product distilled at 150° C. under 3.4 mm. of pressure and had $n_D^{20}$ 1.4747. Based on an empirical formula of $C_{13}H_{19}NO_2$ for the ester product, 6.34% nitrogen is the theoretical proportion, 6.24% being found.

(a) A mixture containing 40 parts by weight of the prepared n-butyl cyanonorcamphane ester product and 100 parts by weight of cellulose triacetate was milled on heated rolls to give a clear flexible and tough plastic sheet, the ester additive to the cellulose triacetate not oiling-out on standing and showing resistance to water leaching. In a like manner polyvinyl chloride was similarly suitably plasticized with the same proportions of the prepared n-butyl cyanonorcamphane ester product.

(b) A mixture containing 25 parts by weight of the prepared n-butyl cyanonorcamphane ester product and 100 parts by weight of a copolymer of 40 parts by weight of acrylonitrile and 60 parts by weight of methylacrylate was milled on heated rolls. The copolymer was converted to a plasticized coherent sheet. The resulting plasticized product on injection molding in accordance with usual practice had a tensile strength of 5377 p.s.i., an elongation of 86% and an Izod impact strength of 3.9 ft. lb. per inch at 72° F. The plasticizer in the polymer showed good permanence properties in that it did not exude therefrom on standing and it was resistant to water leaching. For comparative purposes, an attempt was made to plasticize 100 parts by weight of the described acrylonitrilemethyl acrylate copolymer with 25 parts by weight of the diisobutyl ester of norcamphane-2,3-dicarboxylic acid, this norcamphane diester not plasticizing the nitrile-containing polymeric material. However, the diisobutyl ester of norcamphane-2,3-dicarboxylic acid was found suitable for plasticizing cellulose triacetate and polyvinyl chloride in these same proportions.

Example 5

The n-nonyl ester of the invention was prepared by substituting n-nonanol for 2-ethylbutanol in the process described in Example 3. The resulting ester product was an isomeric mixture of the n-nonyl esters of 6-cyanonorcamphane-2-carboxylic acid and 6-cyanonorcamphane-3-carboxylic acid. The ester product distilled at 178° C. under 2 mm. of pressure. Based on an empirical formula of $C_{18}H_{29}NO_2$ for the ester product, 4.8% nitrogen is the theoretical proportion, 4.68% was found. A mixture containing 40 parts by weight of the prepared n-nonyl cyanonorcamphane ester product and 100 parts by weight of cellulose triacetate was milled on heated rolls to give a clear flexible and tough plastic sheet, the ester additive to the cellulose triacetate not oiling-out on standing and showing resistance to water leaching. In a like manner polyvinyl chloride was similarly suitably plasticized with the same proportions of the prepared n-nonyl cyanonorcamphane ester product.

Thus, the present invention provides a new class of useful esters, these esters having particular utility for plasticizing such resins as cellulosic esters, polyvinyl chloride and nitrile-containing polymers.

Although the invention has been described in detail with reference to certain preferred embodiments thereof, it will be understood that variations and modifications can be effected within the spirit and scope of the invention as described hereinabove and as defined by the appended claims.

We claim:

1. A compound selected from the group consisting of those compounds having the following structural formulas:

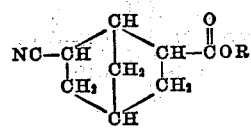

and

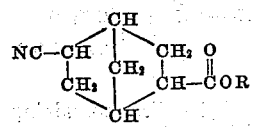

wherein R is an alkyl radical containing 1 to 10 carbon atoms.

2. A compound as described in claim 1 wherein the substituent R is methyl.

3. A compound as described in claim 1 wherein the substituent R is n-butyl.

4. A compound as described in claim 1 wherein the substituent R is 2-ethylbutyl.

5. A compound as described in claim 1 wherein the substituent R is n-nonyl.

6. A plastic composition comprising a resinous material selected from the group consisting of cellulose esters of fatty acids having 2 to 4 carbon atoms, polyvinyl chloride and copolymers of acrylonitrile and methylacrylate, and a plasticizer compound selected from the group consisting of those compounds having the following structural formulas:

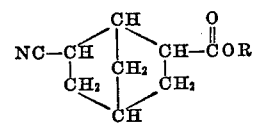

and

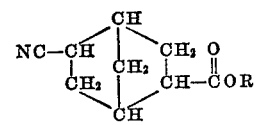

wherein R is an alkyl radical containing 1 to 10 carbon atoms, said plasticizer being present in amounts of 10% to 60% by weight based on the combined weights of said resinous material and said plasticizer.

7. A plastic composition comprising cellulose triacetate and a plasticizer compound selected from the group consisting of those compounds having the following structural formulas:

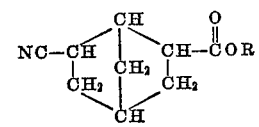

and

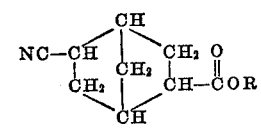

wherein R is an alkyl radical containing 1 to 10 carbon atoms, said plasticizer being present in amounts of 20% to 40% by weight based on the combined weights of said cellulose triacetate and said plasticizer.

8. A plastic composition comprising a polyvinyl chloride resin and a plasticizer compound selected from the group consisting of those compounds having the following structural formulas:

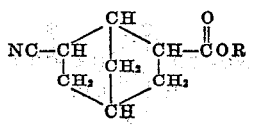

and

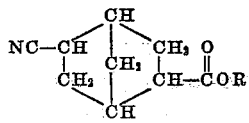

wherein R is an alkyl radical containing 1 to 10 carbon atoms, said plasticizer being present in amounts of 20% to 40% by weight based on the combined weights of said polyvinyl chloride resin and said plasticizer.

9. A plastic composition comprising a copolymer of acrylonitrile and methylacrylate plasticized with a compound selected from the group consisting of those compounds having the following structural formulas:

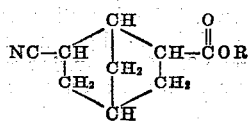

and

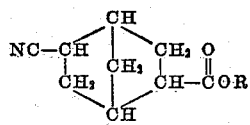

wherein R is an alkyl radical containing 1 to 10 carbon atoms, said plasticizer being present in amounts of 20% to 40% by weight based on the combined weights of said copolymer and said said plasticizer.

No references cited.